United States Patent
Miyaji et al.

(10) Patent No.: US 8,151,653 B2
(45) Date of Patent: Apr. 10, 2012

(54) CORIOLIS FLOWMETER

(75) Inventors: Nobuo Miyaji, Musashino (JP); Toshio Iino, Musashino (JP); Akinori Yoshino, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 39 days.

(21) Appl. No.: 12/836,098

(22) Filed: Jul. 14, 2010

(65) Prior Publication Data

US 2011/0011186 A1    Jan. 20, 2011

(30) Foreign Application Priority Data

Jul. 16, 2009    (JP) ................. 2009-167684

(51) Int. Cl.
*G01F 1/84* (2006.01)
(52) U.S. Cl. ................. 73/861.356
(58) Field of Classification Search ............ 73/861.356, 73/504.12; 702/190
See application file for complete search history.

(56) References Cited

U.S. PATENT DOCUMENTS

| | | | |
|---|---|---|---|
| 7,779,688 B2 * | 8/2010 | Sato et al. ............ | 73/504.12 |
| 7,805,261 B2 * | 9/2010 | Bell et al. ............ | 702/45 |
| 2011/0166801 A1 | 7/2011 | Cunningham et al. | |

FOREIGN PATENT DOCUMENTS

| | | |
|---|---|---|
| CN | 101268342 A | 9/2008 |
| JP | 08-029229 A | 2/1996 |
| JP | 2002-062167 A | 2/2002 |
| JP | 2002-525623 A | 8/2002 |

OTHER PUBLICATIONS

Japanese Office Action issued in corresponding Japanese Patent Application No. 2009-167684 on Jun. 3, 2011.
Communication dated Jan. 18, 2012 from the State Intellectual Property Office of P.R. China in counterpart Chinese application No. 201010232555.0.

* cited by examiner

*Primary Examiner* — Jewel V Thompson
(74) *Attorney, Agent, or Firm* — Sughrue Mion, PLLC

(57) ABSTRACT

A Coriolis flowmeter 10 vibrates a measurement tube through which a fluid subject to measurement flows, detects vibrations including Coriolis force developed in the fluid from the vibrations, and measures a mass flow rate of the fluid from a detection signal. The Coriolis flowmeter is characterized by including fluctuation calculation section 50 that calculates fluctuations from a detection signal SA; status value calculation section 60 that calculates a status value showing a state of air bubbles in the fluid from the fluctuations calculated by the fluctuation calculation section 50, and determination section 70 that determines a state of air bubbles from the status value calculated by the status value calculation section 60.

10 Claims, 9 Drawing Sheets

CORIOLIS FLOWMETER

CROSS-REFERENCE TO RELATED APPLICATION

This application is based on and claims priority under 35 U.S.C. §119 from Japanese Patent Application No. 2009-167684 filed on Jul. 16, 2009.

BACKGROUND

1. Technical Field

The present invention relates to a Coriolis flowmeter and, more particularly, to a Coriolis flowmeter that determines a state of air bubbles in a fluid subject to measurement (hereinafter called a "target fluid").

2. Description of the Related Art

A Coriolis flowmeter is used in measuring a flow rate of a target fluid in flow rate control performed in a chemical plant, or the like. A configuration of an example Coriolis flowmeter is illustrated in JP-A-8-29229.

Figure 9:
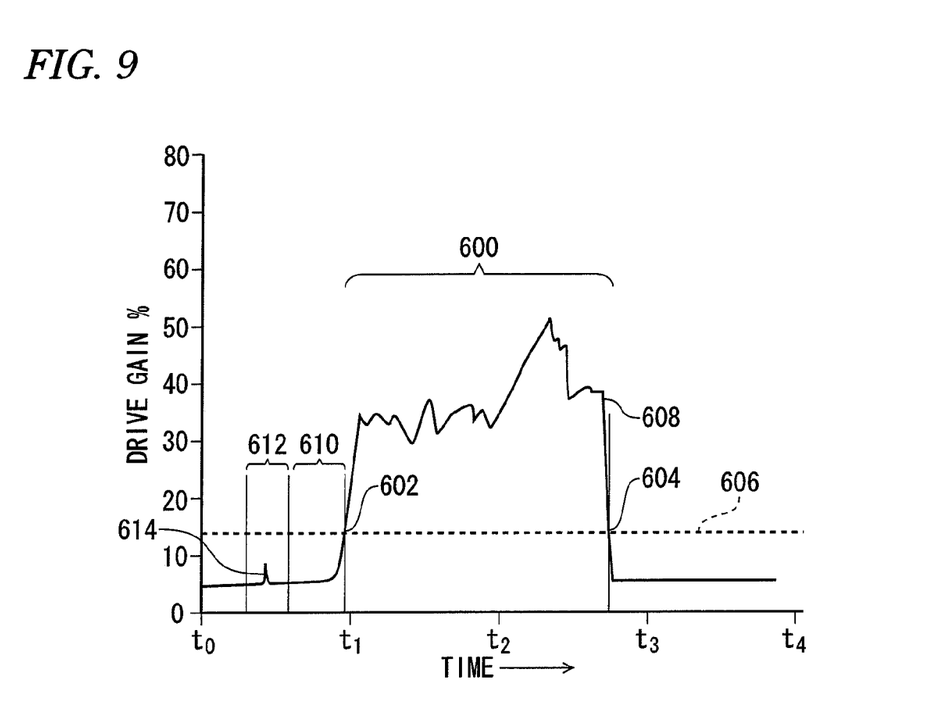
FIG. 9 is an exemplary diagram showing a time variation in drive gain of a drive circuit that activates a measurement tube of a Coriolis flowmeter sensor described in connection with the related art.

In addition to being able to measure a flow rate, the Coriolis flowmeter can also detect air bubbles in a target fluid, and a method for detecting air bubbles is described in JP-T-2002-525623. The method for detecting air bubbles is described by reference to FIG. 9. FIG. 9 is a view showing a time variation in drive gain of a drive circuit that activates a measurement tube of a Coriolis flowmeter sensor.

When air bubbles have got into a target fluid, a loss in drive energy of the measurement tube increases, so that a vibration amplitude of the measurement tube becomes smaller. In this case, in order to hold a predetermined vibration, the drive gain of the drive circuit and a drive voltage output from the drive circuit increase. When the drive gain exceeds a threshold value, mixing of air bubbles is detected.

In FIG. 9, a threshold value for detecting air bubbles is taken as 606. Air bubbles are not mixed in a target fluid during a period from time t0 to time t1, and the drive gain is smaller than the threshold value 606.

Air bubbles begin to get into the target fluid from time t1 and are mixed in the target fluid during a period of time 600. Consequently, the drive gain exceeds the threshold value 606 during this period, and mixing of the air bubbles is detected.

However, when a pressure of the target fluid is high, diameters of air bubbles become smaller than those achieved when the pressure is low. Therefore, a loss in drive energy becomes smaller, and the drive gain decreases during a period of time 600 shown in FIG. 9.

When an average drive gain achieved during the period of time 600 becomes slightly larger than the threshold value 606, the drive gain goes up and down relative to the threshold value 606 because the drive gain is fluctuating. Fluctuation of the drive gain leads to a problem of repeated presence and absence of air bubbles occurring during the period of time 600, which in turn makes it impossible to accurately detect air bubbles.

SUMMARY

The present invention is directed toward a Coriolis flowmeter and provides a Coriolis flowmeter that accurately determines a state of air bubbles in a fluid subject to measurement regardless of variations in pressure of the fluid.

In order to accomplish the objective, according to a first aspect of the invention, there is provided a Coriolis flowmeter that vibrates a measurement tube through which a fluid subject to measurement flows, detects vibrations including Coriolis force developed in the fluid from the vibrations, and measures a mass flow rate of the fluid from a detection signal, the Coriolis flowmeter including:

a fluctuation calculation section that calculates fluctuations based on the detection signal;

a status value calculation section that calculates a status value showing a state of air bubbles in the fluid from the fluctuations calculated by the fluctuation calculation section; and a determination section that determines a state of air bubbles from the status value calculated by the status value calculation section.

According to a second aspect of the invention, there is provided the Coriolis flowmeter as set forth in the first aspect, wherein the fluctuation calculation section includes:

a reference signal generation section that generates a reference signal through use of a frequency or angular velocity calculated based on the detection signal;

an average calculation section that calculates an average based on the reference signal generated by the reference signal generation section and on the detection signal; and an average variation calculation section that calculates variations in the average calculated by the average calculation section as the fluctuations.

According to a third aspect of the invention, there is provided the Coriolis flowmeter as set in the second aspect, wherein the reference signal generation section generates a first reference signal and a second reference signal being 90° out of phase with the first reference signal; and wherein the average calculation section calculates a first average that is an average of a product of the detection signal and the first reference signal and calculates a second average which is an average of a product of the detection signal and the second reference signal.

According to a fourth aspect of the invention, there is provided the Coriolis flowmeter as set forth in the second or third aspect, wherein the average variation calculation section calculates, as the fluctuations, variations in the average based on a current average, a last average, and a last but one average.

According to a fifth aspect of the invention, there is provided the Coriolis flowmeter as set forth in any one of the first through fourth aspects, wherein the status value calculation section calculates a square mean value, a root mean square value, an average absolute value, or a square root of an average absolute value of the fluctuations.

According to a sixth aspect of the invention, there is provided the Coriolis flowmeter as set forth in the third aspect, wherein the average variation calculation section calculates, as first fluctuations, variations in the first average based on a current value of the first average, a last value of the first average and a last but one value of the first average and calculates, as second fluctuations, variations in the second average based on a current value of the second average, a last value of the second average, and a last but one value of the second average; and the status value calculation section calculates an average of squares of the first fluctuations and squares of the second fluctuations, a square root of the average, and an average of absolute values of the first fluctuations and absolute values of the second fluctuations or a square root of the average.

According to a seventh aspect of the invention, there is provided the Coriolis flowmeter as set forth in any one of the first through sixth aspects, wherein the determination section compares the status value with a threshold value to determine a state of the air bubbles.

According to an eighth aspect of the invention, there is provided the Coriolis flowmeter as set forth in the seventh aspect, further including:

a threshold value generation section that generates, as the threshold value, a value based on the status value calculated when the air bubbles are not present.

According to a ninth aspect of the invention, there is provided the Coriolis flowmeter as set forth in the first aspect, wherein the fluctuation calculation section includes:

a first shift section that generates a first shift detection signal which is 90° out of phase with a first detection signal detected by one vibration detection section;

an average calculation section that calculates an average based on a first shift detection signal generated by the first shift section, a second detection signal detected by the other vibration detection section, and the first detection signal; and an average variation calculation section that calculates, as the fluctuations, variations in the average calculated by the average calculation section.

According to a tenth aspect of the invention, there is provided the Coriolis flowmeter as set forth in the first aspect, wherein the fluctuation calculation section includes:

a first shift section that generates a first shift detection signal which is 90° out of phase with a first detection signal detected by one vibration detection section;

a second shift section that generates a second shift detection signal which is 90° out of phase with a second detection signal detected by the other vibration detection section;

an average calculation section that calculates an average based on a first shift detection signal generated by the first shift section, a second shift detection signal generated by the second shift section, the first detection signal, and the second detection signal; and an average variation calculation section that calculates, as the fluctuations, variations in the average calculated by the average calculation section.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not limited the scope of the invention.

FIGS. 1A and 1B show a detection unit of a Coriolis flowmeter, wherein

DETAILED DESCRIPTION

Various embodiments according to the invention will be described hereinafter with reference to the accompanying drawings.

First Embodiment

Figure 1A:
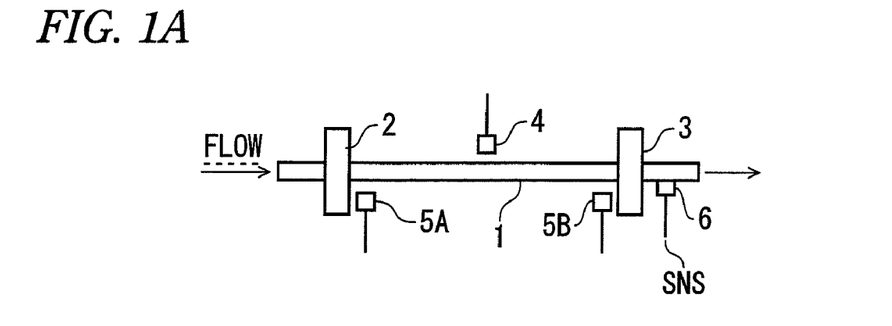
FIG. 1A is an exemplary block diagram and FIG. 1B is an exemplary operation diagram.
Figure 1B:
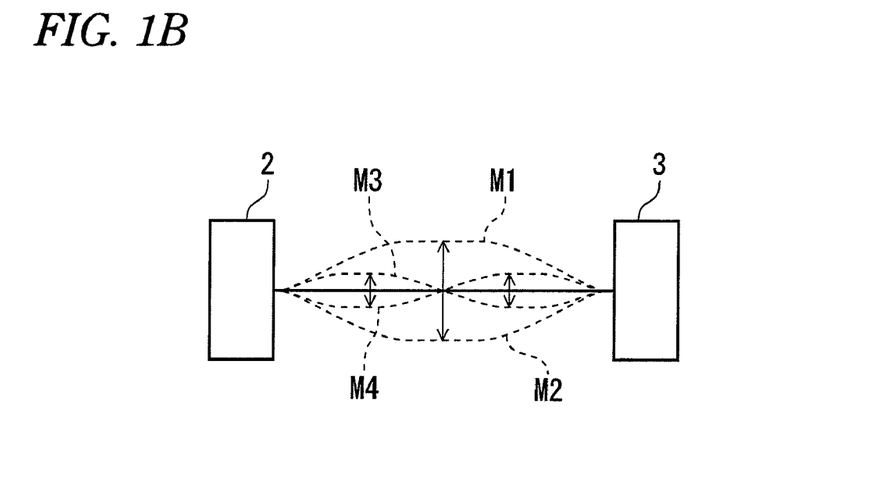
Figure 2:
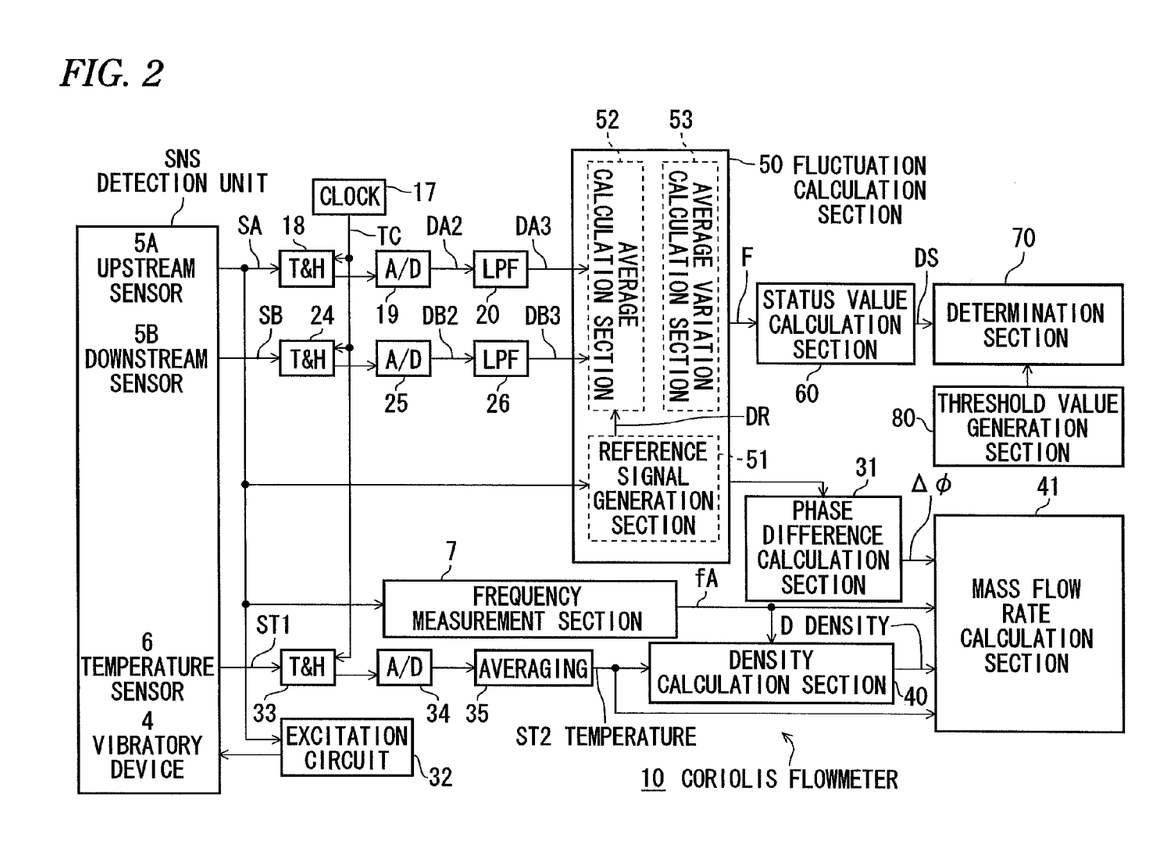
FIG. 2 is an exemplary block diagram of the Coriolis flowmeter to which the present invention applies.

FIG. 1A is a block diagram of a detection unit SNS of a Coriolis flowmeter; FIG. 1B is an explanatory operation diagram for describing operation of the detection unit SNS; and FIG. 2 is a block diagram of a Coriolis flowmeter 10 to which the present embodiment applies, and explanations are provided by reference to these drawings.

In FIG. 1A, a measurement tube may be of another type; for instance, a U-shaped tube type. For the sake of brevity, descriptions are provided by reference to a straight tube type.

Reference numeral 1 designates a measurement tube that enables flow of a fluid subject to measurement (hereinafter referred to as a "target fluid"), and the target fluid flows through the tube from left to right. Both ends of the measurement tube 1 are fastened to support members 2 and 3, respectively. A vibratory device 4 that mechanically vibrates the measurement tube 1 in the vertical direction is disposed in the vicinity of a center area of the measurement tube 1.

An upstream sensor 5A (one vibration detection section) and a downstream sensor 5B (the other vibration detection section) that detect vibrations of the measurement tube 1 are fastened in the proximity of areas of the measurement tube 1 supported by the support members 2 and 3. A temperature sensor 6 used for compensating for a temperature is disposed in the vicinity of the support member 3. The detection unit SNS is constituted of the aforementioned elements.

In FIG. 1B, when the target fluid flows into the measurement tube 1 in a state where vibrations are imparted from the vibratory device 4 to the measurement tube 1 in a shape of a primary mode as designated by reference symbols M1 and M2, Coriolis force develops in the target fluid, and the measurement tube 1 vibrates in a shape of a secondary mode as indicated by M3 and M4.

In reality, the measurement tube 1 undergoes vibrations while these two types of vibration patterns are superimposed. The Coriolis flowmeter measures a mass flow rate of the target fluid on the basis of a displacement signal SA (a first detection signal) produced as a result of the upstream sensor 5A detecting deformation induced by the vibrations of the measurement tube 1 and a displacement signal SB (a second detection signal) produced as a result of the downstream sensor 5B detecting deformation induced by the same.

In FIG. 2, a characteristic of the Coriolis flowmeter 10 to which the present embodiment applies lies in inclusion of fluctuation calculation section 50 having a reference signal generation section 51, average calculation section 52, and an average variation calculation section 53; status value calculation section 60; determination section 70; and threshold value generation section 80.

The reference signal generation section 51 receives the displacement signal SA and outputs a reference signal DR to the average calculation section 52. The average calculation section 52 receives the reference signal DR from the reference signal generation section 51, an output signal DA3 from a low-pass filter (LPF) 20, and outputs an average to the average variation calculation section 53. The average variation calculation section 53 receives an average from the average calculation section 52 and outputs a fluctuation F to the status value calculation section 60.

The status value calculation section 60 receives the fluctuation F from the average variation calculation section 53 and outputs a status value DS to the determination section 70. The determination section 70 receives the status value DS from the status value calculation section 60 and a threshold value from the threshold value generation section 80, thereby determining a state of air bubbles.

Operation of track-and-hold (T&H) circuits 18 and 24, operation of analogue-to-digital converters (A/D) 19 and 25, and operation of low-pass filters (LPF) 20 and 26 for the displacement signals SA and SB output from the detection unit SNS are now described.

A clock signal oscillator 17 generates a timing signal TC having a predetermined sampling period regardless of the vibrations of the measurement tube 1.

The displacement signal SA is input in the form of; for instance, $A \times \sin(\omega_A \times t + \Phi_A)$, to the track-and-hold circuit 18, where the signal is sequentially sampled and held by the timing signal TC that determines a sampling time point. The track-and-hold circuit 18 outputs $A \times \sin(\omega_A \times t(i) + \Phi_A)$ to the analogue-to-digital converter 19.

Reference symbol A denotes a voltage amplitude (V) of the displacement signal SA; $\omega_A$ denotes angular velocity (rad/s) of the displacement signal SA; a variable "i" denotes a consecutive number (an integer) assigned to a sampling time point in time sequence; and t(i) denotes a time (s) of the sampling time point "i." Further, reference symbol $\Phi_A$ denotes a phase difference (rad) between the displacement signal SA and a reference signal DR1 (a sinusoidal wave $\sin(\omega \times t)$) to be described later.

The held displacement signal SA is input to the analogue-to-digital converter 19, where the signal is sequentially converted into a digital signal DA2. The digital signal DA2 is output to the low-pass filter 20 where processing is performed in a digital format.

The low-pass filter 20 eliminates frequency components that are higher than frequencies of vibrations of the measurement tube and outputs a digital signal DA3 to the average calculation section 52. For instance, the low-pass filter 20 employs an FIR (Finite Impulse Response) filter that is one type of a digital filter.

In the meantime, the displacement signal SB is input in the form of; for instance, $B \times \sin(\omega_B \times t + \Phi_B)$ to the track-and-hold circuit 24, where the displacement signal is sequentially sampled/held by the timing signal TC that determines a sampling time point. The track-and-hold circuit 24 outputs a $B \times \sin(\omega_B \times t(i) + \Phi_B)$ to the analogue-to-digital converter 25.

Reference symbol B denotes a voltage amplitude (V) of the displacement signal SB; $\omega_B$ denotes angular velocity (rad/s) of the displacement signal SB; a variable "i" denotes a consecutive number (an integer) assigned to a sampling time point in time sequence; and t(i) denotes a time (s) of the sampling time point "i." Further, reference symbol $\Phi_B$ denotes a phase difference (rad) between the displacement signal SB and a reference signal DR1 (a sinusoidal wave $\sin(\omega \times t)$) to be described later.

The held displacement signal SB is input to the analogue-to-digital converter 25, where the signal is sequentially converted into a digital signal DB2. The digital signal DB2 is output to the low-pass filter (LPF) 26 where processing is performed in a digital format.

The low-pass filter 26 has the same configuration as that of the low-pass filter 20; eliminates frequency components that are higher than the frequencies of vibrations of the measurement tube; and outputs a digital signal DB3 to the average calculation section 52. When the low-pass filters 20 and 26 are FIR filters, a gain characteristic, a group delay frequency characteristic, and the like, of the filters are also commonly selected in advance.

The displacement signal SA is input to an excitation circuit 32, and an excitation voltage commensurate with the displacement signal SA is output to the vibratory device 4. The vibratory device 4 is activated so as to assume the shape of; for instance, a sinusoidal waveform.

Figure 3:
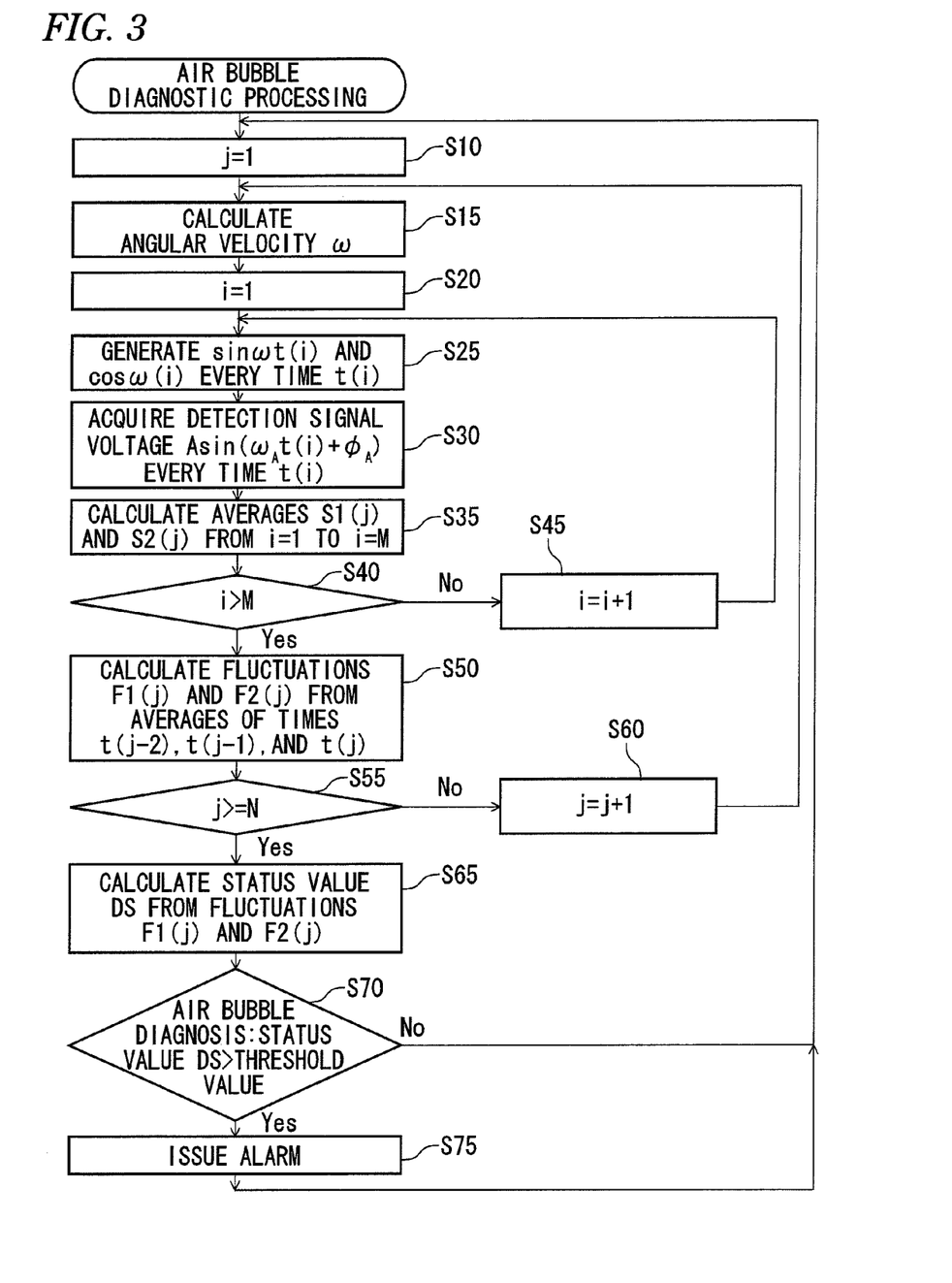
FIG. 3 is an exemplary operation flowchart of air bubble diagnostic processing to which the present invention applies.

With further reference to FIG. 3, there is now described air bubble diagnostic processing performed by use of the reference signal generation section 51, the average calculation section 52, and the average variation calculation section 53 that are provided in the fluctuation calculation section 50; the status value calculation section 60; the determination section 70; and the threshold value generation section 80. FIG. 3 is an operation flowchart of air bubble diagnostic processing.

Air bubble diagnostic processing is described by use of the displacement signal SA; however, the displacement signal SB may also be used instead.

In step S10 shown in FIG. 3, the reference signal generation section 51 sets one on "j" (a variable). Reference symbol "j" denotes a consecutive number (an integer) assigned to each of averages S1 and S2 and each of time-series values of the fluctuations F1 and F2.

In step S15, the reference signal generation section 51 calculates angular velocity ω (rad/s) of the displacement signal SA and sets one on the variable "i" in step S20.

For instance, there is counted the number of times the voltage of the displacement signal SA comes to zero within a predetermined period of time, and the angular velocity ω can be calculated by use of the predetermined period of time and the count value. Alternatively, a frequency "f" (Hz) of the displacement signal SA is calculated in place of the angular velocity ω, and the angular velocity ω may be calculated by use of the frequency "f" ($\omega = 2 \times \pi \times f$ ("π" is a circle ratio)).

In step S25, every time t(i) the reference signal generation section 51 generates, by use of the angular velocity ω, a reference signal DR1 $\sin(\omega \times t(i))$ (a sinusoidal waveform: a first reference signal) and a reference signal DR2 $\cos(\omega \times t(i))$ (a cosine waveform: a second reference signal) that is 90° out of phase with the reference signal DR1. The reference signals DR1 and DR2 are output to the average calculation section 52.

In step S30, the average calculation section 52 receives from the low-pass filter 20 a signal (DA3) generated through digital conversion of a signal $A \times \sin(\omega_A \times t(i) + \Phi_A)$.

In step S35, the average calculation section 52 calculates an average S1(j) (a first average) determined by dividing the product of the signal DA3 and the reference signal DR1 by M, through use of Equation (1) provided below. Further, the average calculation section also calculates an average S2(j) (a second average) of M products of the signal DA3 and the reference signal DR2, through use of Equation (2) provided below.

[Mathematical Expression 1]

$$S1(j) = \frac{A \times \sum_{i=1}^{M} (\sin(\omega \times t(i)) \times \sin(\omega A \times t(i) + \Phi A))}{M} \quad (1)$$

[Mathematical Expression 2]

$$S2(j) = \frac{A \times \sum_{i=1}^{M}(\cos(\omega \times t(i)) \times \sin(\omega A \times t(i) + \Phi A))}{M} \quad (2)$$

When the variable "i" is smaller than M (a first predetermined number) (No in step S40), processing proceeds to step S45, where one is added to the variable "i," and processing returns to step S25, where processing pertaining to the respective steps is iterated, whereby numerators of Equations (1) and (2) are integrated to M in connection with the averages S1(j) and S2(j). When the variable "i" has come to M (Yes is selected in step S40), the integrated value is divided by M, thereby determining the averages. The averages S1(j) and S2(j) may also be calculated from moving averages.

When the variable "i" has come to M or more, processing proceeds to step S50. In step S50, the average variation calculation section 53 calculates variations in the averages S1(j) and S2(j) from averages S1(j), S1(j−1), Si(j−2), S2(j, S2(j−1), and S2(j−2) at times t(j), t(j−1), and t(j−2). The variations are taken as fluctuations F1(j) (a first fluctuation) and F2(j) (a second fluctuation).

Of the averages, a current value calculated during a current operation period is taken as S1(j), a last value calculated during a last operation period is taken as S1(j−1), and a last but one value calculated during a last but one operation period is taken as S1(j−2). The fluctuation F1(j) is then calculated by means of two difference mode of operation represented by Equation (3) provided below.
[Mathematical Expression 3]

$$F1(j) = S1(j) - 2 \times S1(j-1) + S1(j-2) \quad (3)$$

Likewise, of the averages, a current value calculated during a current operation period is taken as S2(j), a last value calculated during a last operation period is taken as S2(j−1), and a last but one value calculated during a last but one operation period is taken as S2(j−2). The fluctuation F2(j) is then calculated by means of two difference mode of operation represented by Equation (4) provided below.
[Mathematical Expression 4]

$$F2(j) = S2(j) - 2 \times S2(j-1) + S2(j-2) \quad (4)$$

In the case of; for instance, j=3, we have F1(3)=S1(3)−2×S1(2)+S1(1) and F2(3)=S2(3)−2×S2(2)+S2(1).

In the case of; for instance, j=50, we have F1(50)=S1(50)−2×S1(49)+S1(48) and F2(50)=S2(50)−2×S2(49)+S2(48).

After calculation of the fluctuations F1(j) and F2(j), processing proceeds to step S55. In step S55, when the variable "j" is smaller than N (a second predetermined number) (No is selected in step S55), processing proceeds to step S60. After one has been added to the variable "j," processing returns to step S15. Thus, processing pertaining to the respective steps is iterated.

When the variable "j" has become N or more (Yes is selected in step S55), processing proceeds to step S65. In step S65, after having received the fluctuations F1(3) to F1(N) and F2(3) to F2(N) from the average variation calculation section 53, the status value calculation section 60 calculates from the values a status value DS showing a state of air bubbles.

When there are no air bubbles or little air bubbles, fluctuations are small; hence, the status value DS becomes smaller. The fluctuations become greater as an amount of air bubble becomes greater, and the status value DS also becomes greater correspondingly.

The status value DS is calculated as an average determined by dividing a square of the fluctuation F1(j) and a square of the fluctuation F2(j) by (N−3), as represented by Equation (5) provided below.

[Mathematical Expression 5]

$$DS = \frac{\sum_{j=3}^{N}(F1(j)^2 + F2(j)^2)}{N-3} \quad (5)$$

A square root of a value calculated by Equation (5) may also be taken as the status value DS.

By way of another example, the status value DS is calculated as an average determined by dividing an absolute value of the fluctuation F1(j) and an absolute value of the fluctuation F2(j) by (N−3), as represented by Expression (6) provided below.

[Mathematical Expression 6]

$$DS = \frac{\sum_{j=3}^{N}(|F1(j)| + |F2(j)|)}{N-3} \quad (6)$$

A square root of a value calculated by Equation (6) may also be taken as the status value DS.

After calculation of the status value DS, processing proceeds to step S70. In step S70, the determination section 70 receives the status value DS from the status value calculation section 60 and compares the thus-received status value DS with a threshold value, to thus determine a state of air bubbles.

When the status value DS is equal to or larger than the threshold value (Yes is selected in step S70), the amount of air bubbles is large, and hence processing proceeds to step S75. Further, an alarm is output because the air bubbles are mixed in the target fluid or the amount of air bubbles is large. Subsequently, processing returns to step S10, and the air bubble diagnostic processing is iterated.

In the meantime, when the status value DS is equal to or smaller than the threshold value (No is selected in step S70), no alarm is output because the air bubbles are not mixed in the target fluid or the amount of air bubbles is small. Processing then returns to step S10, and the air bubble diagnostic processing is iterated.

Figure 4A:
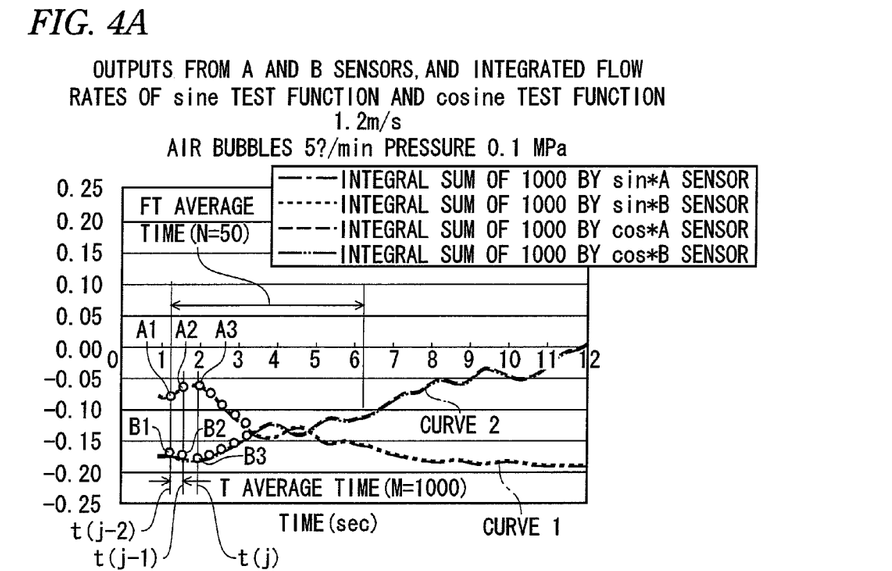
FIGS. 4A and 4B are an exemplary graph of averages S1 and S2 achieved when air bubbles are mixed or not mixed.

FIG. 4A is now described. FIG. 4A is a graph showing time variations in the averages S1(j) and S2(j) achieved in a state where air bubbles are mixed in the target fluid (the amount of air bubbles: 5 liters/min.). A curve 1 designates a graph of the average S1(j), and a curve 2 designates a graph of the average S2(j). Since the air bubbles are mixed in the target fluid, fluctuations arise on the order of seconds.

With reference to FIG. 4A, the averages S1(j) and S2(j), the fluctuations F1(j) and F2(j), and the status value DS calculated by reference to FIG. 3 are now described.

The average S1(j) is first described. An average time T is a value determined by multiplying a sampling period by M. Outlined circle A1 achieved at time t(j−2) on the curve 1 represents an average S1(j−2) of M values calculated through use of Expression (1).

Likewise, outlined circle A2 achieved at a time t(j−1) on the curve 1 represents an average S1(j−1) of the M values. Further, outlined circle A3 achieved at a time t(j) on the curve 1 represents an average S1(j) of the M values.

Similarly, outlined circles B1 through B3 on the curve 2 represent averages S2(j−2), S2(j−1), and S2(j) of the M values calculated through use of Expression (2).

For instance, given that the sampling period is 0.1 millisecond and that M is 1000, an average time T is 100 milliseconds. Specifically, the averages S1(j) and S2(j) are calculated every 100 milliseconds.

The fluctuation F1(j) is then calculated from the averages S1(j−2), S1(j−1), and S1(j) represented by the three outlined circles A1 to A3, through use of Equation (3).

Likewise, the fluctuation F2 (j) is then calculated from the averages S2(j−2), S2(j−1), and S2(j) represented by the three outlined circles B1 to B3, through use of Equation (4).

An average time FT is a value determined by multiplying the average time T by N. The status value DS is calculated from the fluctuations F1(j) and F2(j) determined during a period of the average time FT, through use of Expression (5) or (6).

For instance, given that the average time T is 100 milliseconds and that N is 50, the average time FT is 5 seconds. Specifically, the status value DS is calculated every five seconds.

As mentioned above, during air bubble diagnostic processing of the present embodiment, the fluctuation calculation section 50 calculates the fluctuations F1 and F2 based on the displacement signal SA or SB; the status value calculation section 60 calculates the status value DS showing the state of air bubbles from the fluctuations F1 and F2; and the determination section 70 determines the state of air bubbles from the status value DS. It is thereby possible to accurately determine the state of air bubbles in the target fluid regardless of the level of pressure of the target fluid.

Although air bubbles induce fluctuations having a low frequency of the order of hertz or less, the fluctuations may also be caused for a reason other than the air bubbles. For instance, fluctuations having a high frequency of the order of about 50 Hz or more are sometimes caused by vibrations stemming from a pump attached to the measurement tube.

The high frequency fluctuations are imposed on the low frequency fluctuations caused by air bubbles, whereby it often becomes impossible to accurately determine the state of air bubbles. Accordingly, it is possible to eliminate or lessen influence of the high frequency fluctuations.

As represented by Expressions (1) and (2), the averages S1(j) and S2(j) are averages of the M values. A value of M is now set so as to assume an average number such that the high frequency fluctuations are eliminated but low frequency fluctuations are not eliminated. Thus, only the low frequency fluctuations caused by air bubbles are calculated, and it becomes possible to accurately determine the state of air bubbles.

For instance, as described by reference to FIG. 4A, given that the sampling period is 0.1 millisecond and that M is 1000, the average time T is 100 milliseconds. The high frequency fluctuations (having a frequency of; for instance, 50 Hz or more) are thereby eliminated, and low frequency fluctuations (having a frequency of; for instance, two to three hertz or less) can be calculated without being eliminated.

A value of M can be changeably set to an appropriate value according to a frequency (a low frequency) of fluctuations caused by air bubbles and a frequency (a high frequency) of fluctuations caused by a reason other than the air bubbles.

As represented by Expressions (5) and (6), the status value DS is an average of (N−3) values. Average processing is used for making determination accuracy of the state of air bubbles superior.

As represented by Expressions (5) and (6), the status value DS is calculated by square values or absolute values of the fluctuations F1(j) and F2(j), whereby the following advantages are yielded.

The averages S1(j) and S2(j) and the fluctuations F1(j) and F2(j) can assume positive or negative values. For this reason, when the fluctuations F1(j) and F2(j) are used, as they are, rather than square values or absolute values, values of the fluctuations F1(j) and F2(j) cancel each other by means of averaging operation, whereby the status value DS often comes near zero. In this case, the status value DS becomes the threshold value or less, the air bubbles are determined not to be present, so that the state of the air bubbles cannot be accurately diagnosed.

Meanwhile, when the square values or absolute values of the fluctuations F1(j) and F2(j) are used, the status value DS comes to a positive value. When air bubbles get into the target fluid, the status value DS becomes greater than the threshold value, so that the state of air bubbles can be accurately diagnosed.

The fluctuations F1(j) and F2(j) are calculated by use of the two difference mode of operation as shown by Expressions (3) and (4), whereby the following advantages are yielded.

Figure 4B:
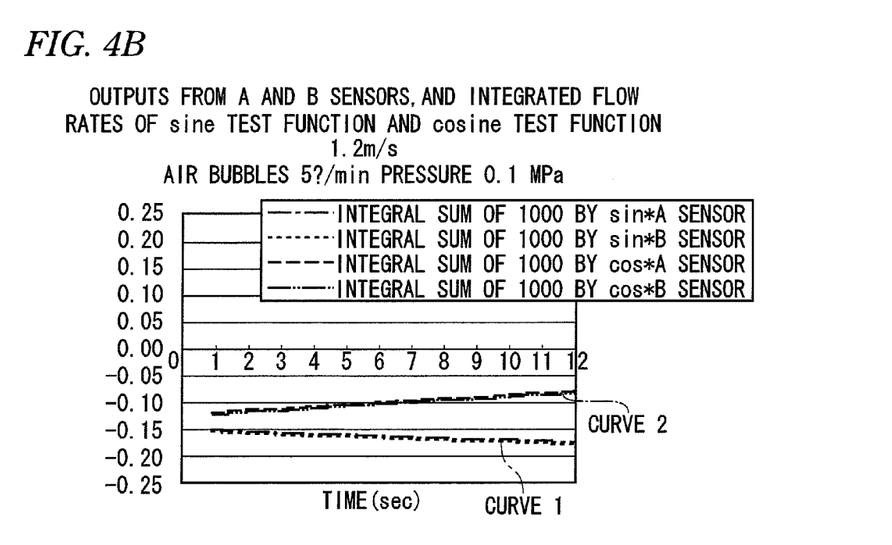

FIG. 4B is a graph showing time variations in the averages S1(j) and S2(j) achieved when no air bubbles are mixed. A curve 1 designates a graph of the average S1(j), and a curve 2 designates a graph of the average S2(j).

Since there are not any air bubbles, the curves 1 and 2 include little fluctuations. The curve 1 decreases at a given gradient, and the curve 2 increases at a given gradient. When the fluctuations F1(j) and F2(j) are calculated by use of a one difference mode of operation in this state; namely, when the fluctuations are calculated by means of F1(j)=S1(j)−S1(j−1) and F2(j)=S2(j)−S2(j−1), F1(j) and F2(j) assume values increased or decreased at the given gradient.

When the gradient is large, the fluctuations F1(j) and F2(j) become greater. Hence, the status value DS calculated by Expression (5) or (6) becomes great to exceed the threshold value. As a result, air bubbles are sometimes erroneously determined to be mixed in spite of absence of air bubbles.

In the meantime, when the two difference mode of operation is used for the fluctuations F1(j) and F2(j), the fluctuations F1(j) and F2(j) substantially come to zero in the state shown in FIG. 4B. Hence, the status value DS comes nearly zero and becomes lower than the threshold value, so that air bubbles are determined to be absent. Hence, it is possible to prevent making of an erroneous determination.

The threshold value generation section 80 shown in FIG. 2 is now described. The threshold value generation section 80 generates a threshold value to be used by the determination section 70. A threshold value to be generated is calculated as follows.

There is first achieved a state in which the target fluid does not include any air bubbles. The air bubble diagnostic processing shown in FIG. 3 is performed in this state, whereby the status value DS is calculated. Provided that the status value is a no-air-bubble status value, the threshold value generation section 80 calculates, as a threshold value, a value determined by multiplying the no-air-bubble status value by a predetermine coefficient or a value determined by adding a predetermined value (an offset value) to the no-air-bubble status value. A calculation result is forwarded as a threshold value to the determination section 70.

The user can determine the predetermined coefficient and the predetermined value by means of an allowable amount of air bubbles mixed.

It is thereby possible for the user, or the like, to generate a threshold value according to the state of air bubbles in the target fluid or the allowable amount of air bubbles mixed, so that more appropriate diagnosis of the state of air bubbles can be carried out.

Processing for calculating a mass flow rate of the target fluid is now described.

In FIG. 2, phase difference calculation section 31 receives the values represented by the numerators of Expressions (1) and (2) from the fluctuation calculation section 50 and calculates a tangent (tan $\Phi_A$) of a phase $\Phi_A$ of the displacement signal SA by means of Expression (7).

[Mathematical Expression 7]

$$\tan\Phi A = \frac{A \times \sum_{i=1}^{M} (\sin(\omega \times t(i)) \times \sin(\omega A \times t(i) + \Phi A))}{A \times \sum_{i=1}^{M} (\cos(\omega \times t(i)) \times \sin(\omega A \times t(i) + \Phi A))} \quad (7)$$

Likewise, a tangent (tan $\Phi_B$) of a phase $\Phi_B$ of the displacement signal SB is calculated by means of Expression (8).

[Mathematical Expression 8]

$$\tan\Phi B = \frac{B \times \sum_{i=1}^{M} (\sin(\omega \times t(i)) \times \sin(\omega B \times t(i) + \Phi B))}{B \times \sum_{i=1}^{M} (\cos(\omega \times t(i)) \times \sin(\omega B \times t(i) + \Phi B))} \quad (8)$$

The phase difference calculation section 31 calculates an inverse tangent ($\tan^{-1} \Phi_A$) of tan $\Phi_A$, thereby determining the phase $\Phi_A$ and calculates an inverse tangent ($\tan^{-1} \Phi_B$) of tan $\Phi_B$, thereby determining the phase $\Phi_B$. The phase $\Phi_B$ is subtracted from the phase $\Phi_A$, thereby calculating a phase difference $\Delta\Phi$ (ascribable to Coriolis force) between the displacement signal SA and the displacement signal SB.

The temperature sensor 6 outputs a temperature signal ST1 to the track-and-hold circuit 33. A plurality of temperature signals held by the timing signal TC that determines a sampling time point are converted by the analogue-to-digital converter 34 into digital signals. The thus-converted digital signals are output to an averaging circuit 35, where the signals are averaged and output as a temperature signal ST2.

The displacement signal SA detected by the upstream sensor 5A is input to frequency measurement section 7, where a signal frequency fA is measured.

The signal frequency fA and the temperature signal ST2 are input to density calculation section 40, and a density D of the target fluid is calculated from them.

The density D, the signal frequency fA, the phase difference $\Delta\Phi$, and the temperature signal ST2 are input to the mass flow rate calculation section 41, and a mass flow rate QM is calculated from them.

Second Embodiment

Figure 5:
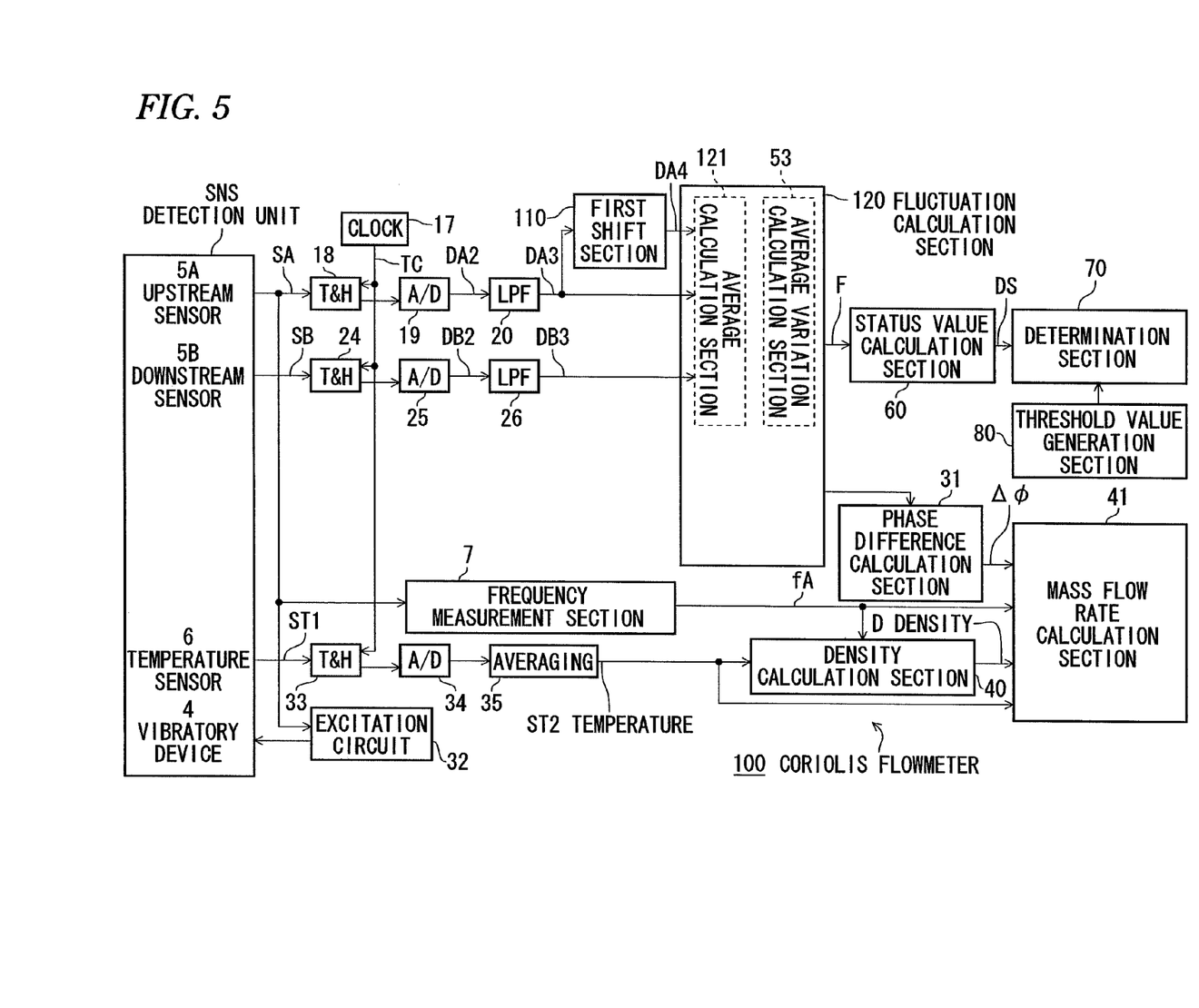
FIG. 5 is another exemplary block diagram of the Coriolis flowmeter to which the present invention applies.

FIG. 5 is a block diagram of a Coriolis flowmeter 100 to which the present embodiment applies, and explanations are provided with reference to the drawing. The Coriolis flowmeter shown in FIG. 5 differs from its counterpart shown in FIG. 2 in terms of addition of first shift section 110, deletion of the reference signal generation section 51 shown in FIG. 2, and average calculation processing of average calculation section 121 in fluctuation calculation section 120.

In the following descriptions, elements that are identical with their counterparts shown in FIG. 2 are assigned the same reference numerals, and their repeated explanations are omitted. Explanations are provided to differences between the first embodiment and the second embodiment.

In FIG. 5, the first shift section 110 receives the output signal DA3 from the low-pass filter 20 and generates a signal DA4 (a first shift detection signal) that is 90° out of phase with the signal DA3 through Hilbert transform processing, or the like and outputs the thus-generated signal to the average calculation section 121.

The average calculation section 121 receives the signals DA3, DA4, and DB3, calculates the averages S1(j) and S2(j) by means of processing to be described later (described by reference to FIG. 6), and outputs the averages to the average variation calculation section 53.

The signal DA3 corresponds to A×sin(ω'×t(i)); the signal DA4 corresponds to A×cos(ω'×t(i)); and the signal DB3 corresponds to B×sin(ω'×t(i)+$\Delta\Phi$).

Reference symbol ω' denotes angular velocity (rad/s) of the displacement signals SA and SB, and $\Delta\Phi$ denotes a phase difference (rad) (ascribable to Coriolis force) between the displacement signals SA and SB.

Figure 6:
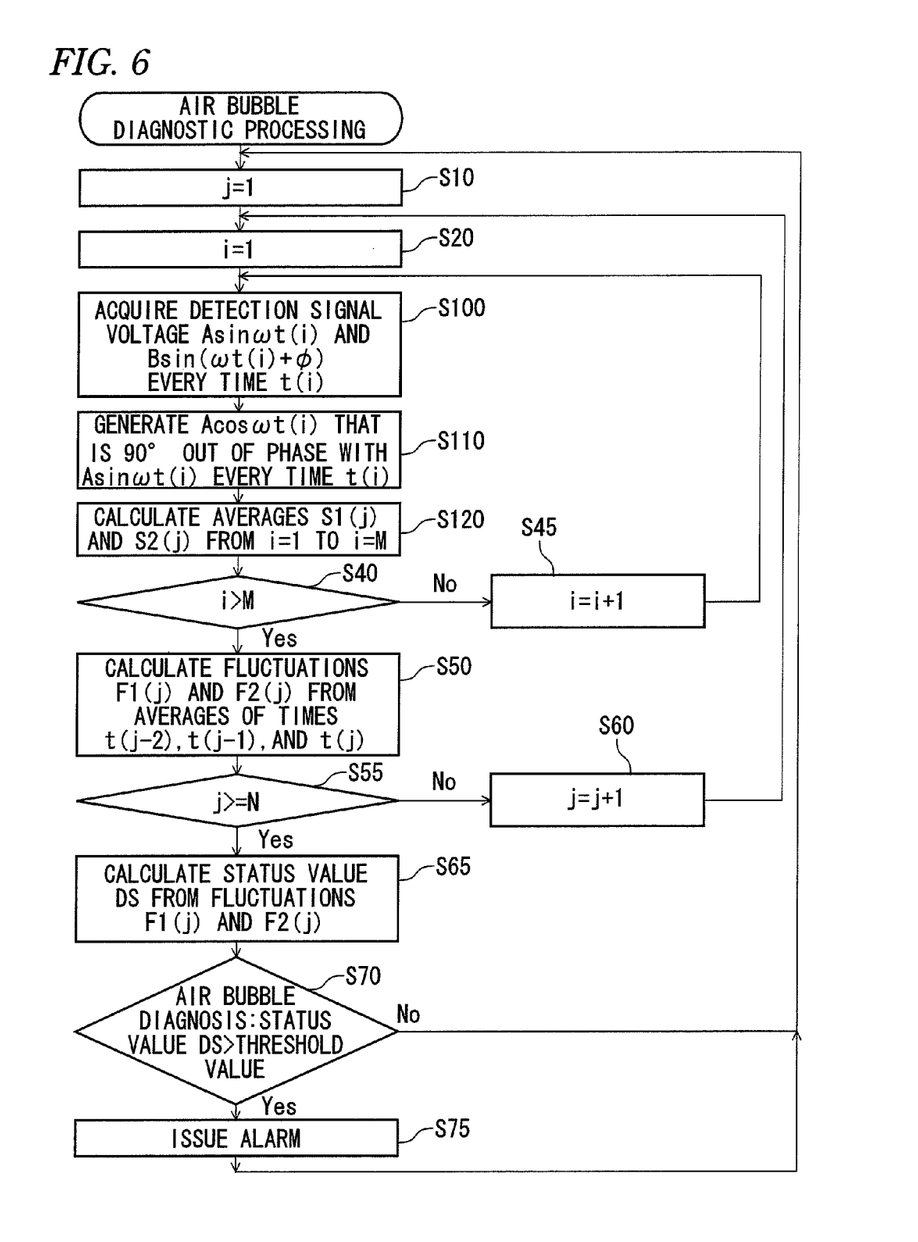
FIG. 6 is another exemplary operation flowchart of air bubble diagnostic processing to which the present invention applies.

With further reference to FIG. 6, air bubble diagnostic processing is now described. FIG. 6 is an operation flowchart of air bubble diagnostic processing. Those elements that are the same as their counterparts shown in FIG. 3 are assigned the same reference numerals, and descriptions are primarily given to differences between the first and second embodiments.

In FIG. 6, one is set on the variable "j" (step S10), and one is set on the variable "i" (step S20). Calculation of the angular velocity ω pertaining to step S15 shown in FIG. 3, and generation of the reference signal pertaining to step S25 are not performed.

In step S100 shown in FIG. 6, the average calculation section 121 receives the signals DA3 and DB3. In step S110, the first shift section 110 generates the signal DA4 and forwards the signal to the average calculation section 121.

In step S120, the average calculation section 121 calculates, through use of Equation (9) provided below, an average S1(j) (the first average) of M products of the signal DA3 and the signal DB3. Further, the average calculation section also calculates, through use of Equation (10) provided below, an average S2(j) (the second average) of M products of the signal DA4 and the signal DB3.

[Mathematical Expression 9]

$$S1(j) = \frac{\sum_{i=1}^{M} (A \times \sin(\omega' \times t(i)) \times B \times \sin(\omega' \times t(i) + \Delta\Phi))}{M} \quad (9)$$

[Mathematical Expression 10]

$$S2(j) = \frac{\sum_{i=1}^{M} (A \times \cos(\omega' \times t(i)) \times B \times \sin(\omega' \times t(i) + \Delta\Phi))}{M} \quad (10)$$

When the variable "i" is smaller than M (the first predetermined number) (No in step S40), processing proceeds to step S45, where one is added to the variable "i," and processing returns to step S100, where processing pertaining to the respective steps is iterated, whereby numerators of Equations (9) and (10) are integrated to M in connection with the averages S1(j) and S2(j). When the variable "i" has come to M (Yes is selected in step S40), the integrated value is divided by M, thereby determining the averages. The averages S1(j) and S2(j) may also be calculated from moving averages.

When the variable "i" has come to M or more, processing proceeds to step S50. Processing subsequent to step S50 is analogous to that shown in FIG. 3.

As mentioned above, during the air bubble diagnostic processing of the present embodiment, the fluctuation calculation section 120 calculates the fluctuations F1 and F2 based on the displacement signals SA, SB and the first shift detection signal DA4 as in the first embodiment. The status value calculation section 60 calculates the status value DS showing a state of the air bubbles from the fluctuations F1 and F2, and the determination section 70 determines the state of the air bubbles from the status value DS. It thereby becomes possible to determine the state of the air bubbles in the target flow with accuracy regardless of the level of pressure of the target fluid.

Third Embodiment

Figure 7:
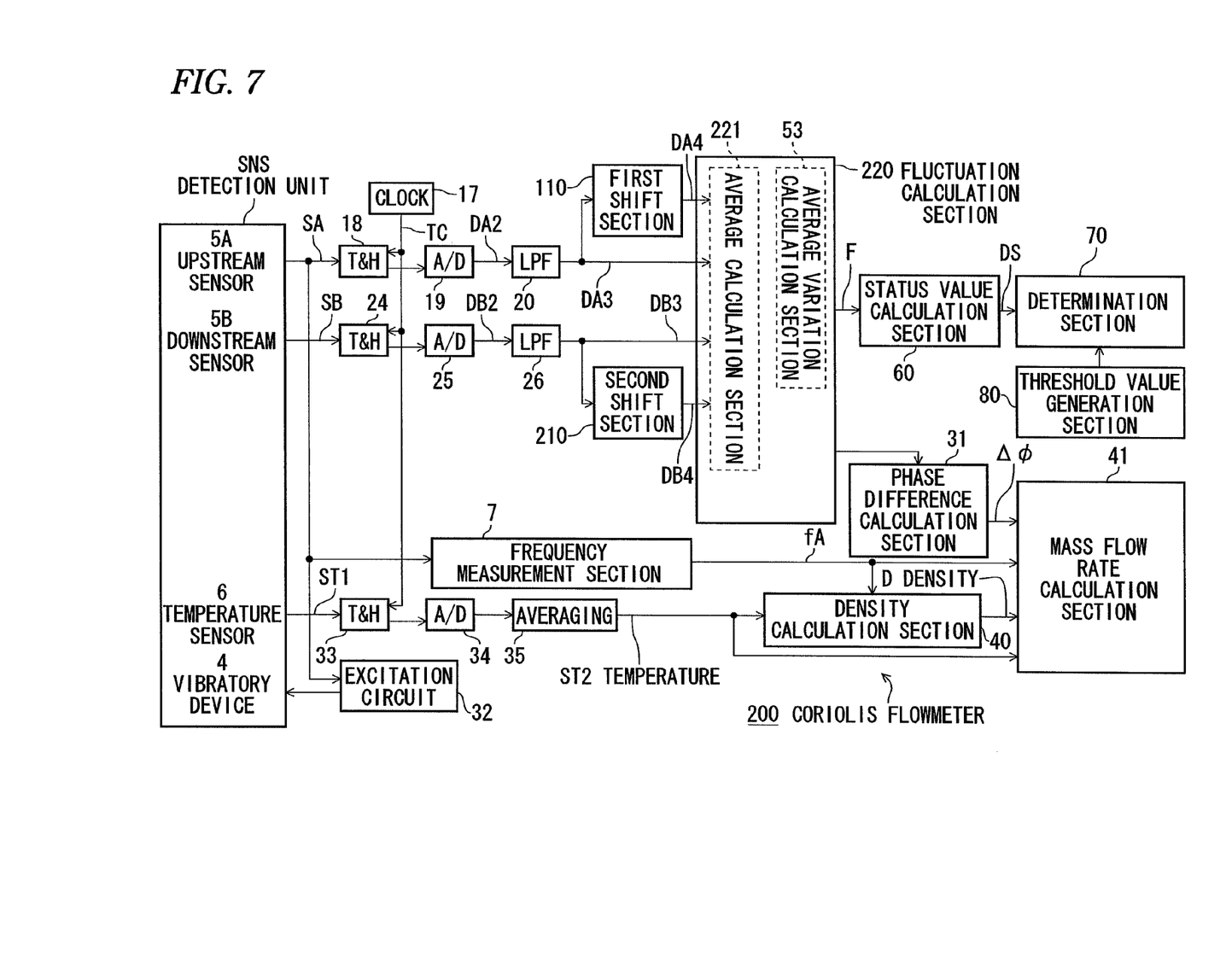
FIG. 7 is another exemplary block diagram of the Coriolis flowmeter to which the present invention applies.

FIG. 7 is a block diagram of a Coriolis flowmeter 200 to which the present embodiment applies, and explanations are provided with reference to the drawing. The Coriolis flowmeter shown in FIG. 7 differs from its counterpart shown in FIG. 2 in terms of addition of the first shift section 110 and second shift section 210, deletion of the reference signal generation section 51 shown in FIG. 2, and average calculation processing of average calculation section 221 in fluctuation calculation section 220.

In the following descriptions, elements that are identical with their counterparts shown in FIG. 2 are assigned the same reference numerals, and their repeated explanations are omitted. Explanations are given to differences between the first embodiment and the third embodiment.

In FIG. 7, the first shift section 110 receives the output signal DA3 from the low-pass filter 20 and generates a signal DA4 (the first shift detection signal) that is 90° out of phase with the signal DA3 through Hilbert transform processing, or the like and outputs the thus-generated signal to the average calculation section 221.

The second shift section 210 receives the output signal DB3 from the low-pass filter 26 and generates a signal DB4 (a second shift detection signal) that is 90° out of phase with the signal DB3 through Hilbert transform processing, or the like and outputs the thus-generated signal to the average calculation section 221.

The average calculation section 221 receives the signals DA3, DA4, DB3, and DB4 and calculates the averages S1(j) and S2(j) by means of processing to be described later (described by reference to FIG. 8), and outputs the averages to the average variation calculation section 53.

The signal DA3 corresponds to $A \times \sin(\omega' \times t(i))$; the signal DA4 corresponds to $A \times \cos(\omega' \times t(i))$; the signal DB3 corresponds to $B \times \sin(\omega' \times t(i) + \Delta\Phi)$; and the signal DB4 corresponds to $B \times \cos(\omega' \times t(i) + \Delta\Phi)$.

Reference symbol $\omega'$ denotes angular velocity (rad/s) of the displacement signals SA and SB, and $\Delta\Phi$ denotes a phase difference (rad) (ascribable to Coriolis force) between the displacement signals SA and SB.

Figure 8:
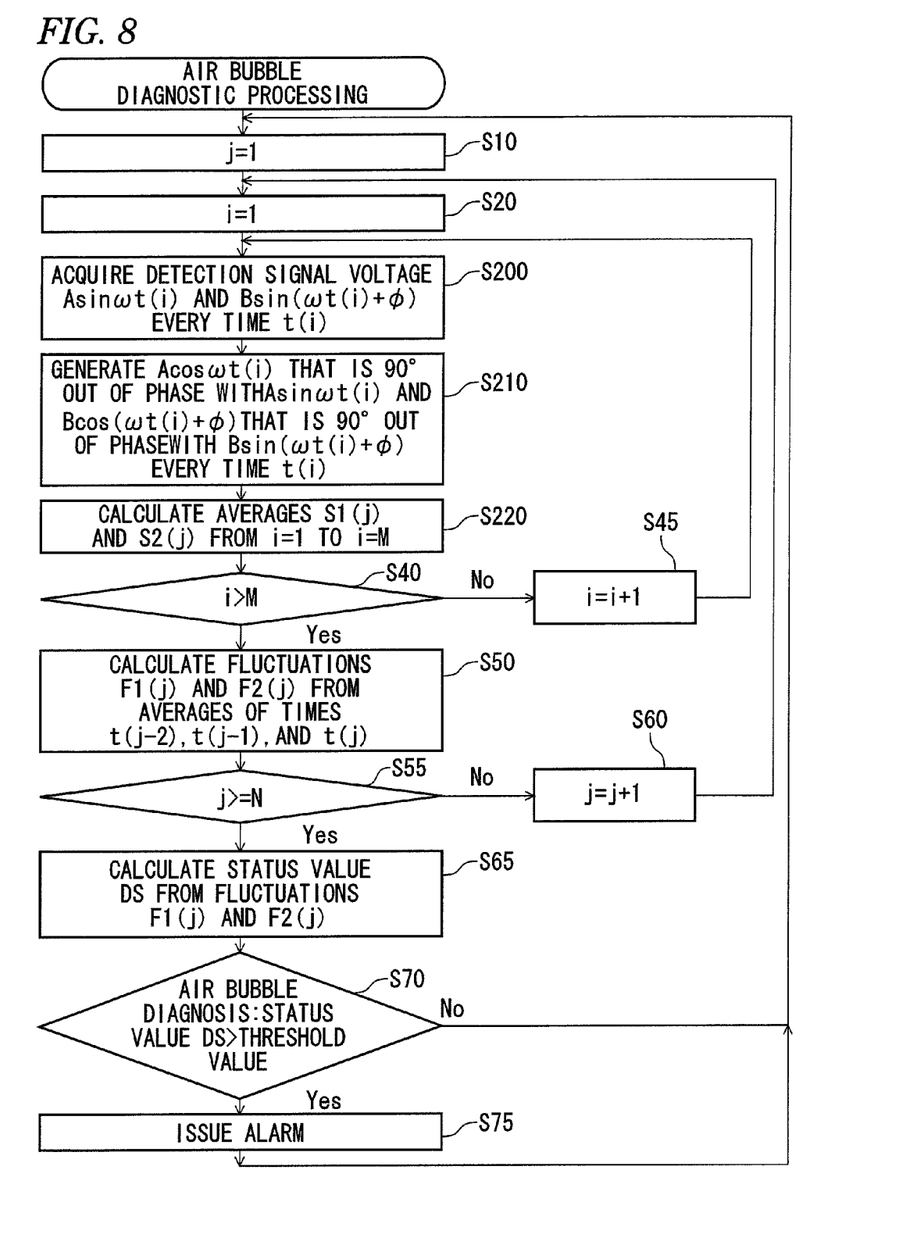
FIG. 8 is another exemplary operation flowchart of air bubble diagnostic processing to which the present invention applies.

With further reference to FIG. 8, air bubble diagnostic processing is now described. FIG. 8 is an operation flowchart of air bubble diagnostic processing. Those elements that are the same as their counterparts shown in FIG. 3 are assigned the same reference numerals, and descriptions are primarily given to differences between the first and third embodiments.

In FIG. 8, one is set on the variable "j" (step S10), and one is set on the variable "i" (step S20). Calculation of the angular velocity $\omega$ pertaining to step S15 shown in FIG. 3, and generation of the reference signal pertaining to step S25 are not performed.

In step S200 shown in FIG. 8, the average calculation section 221 receives the signals DA3 and DB3. In step S210, the first shift section 110 generates the signal DA4 and forwards the signal to the average calculation section 221. The second shift section 210 generates the signal DB4 and forwards the signal to the average calculation section 221.

In step S220, the average calculation section 221 calculates, through use of Equation (11) provided below, an average S1(j) (the first average) of results of M subtractions of a product (Z2) of the signal DA4 and the signal DB3 from a product of the signal DA3 and the DB4 (Z1). Further, the average calculation section also calculates, through use of Equation (12) provided below, an average S2(j) (the second average) of results of M additions of a product (Z4) of the signal DA3 and the signal DB3 to a product (Z3) of the signal DA4 and the signal DB4.

[Mathematical Expression 11]

$$S1(j) = \frac{\sum_{i=1}^{M}(Z1 - Z2)}{M} \quad (11)$$

Reference symbol Z1 of Mathematical Expression 11 is represented by Expression (11a) provided below, and Z2 is represented by Expression (11b) provided below.

[Mathematical Expression 12]

$$Z1 = A \times \sin(\omega' \times t(i)) \times B \times \cos(\omega' \times t(i) + \Delta\Phi) \quad (11a)$$

[Mathematical Expression 13]

$$Z2 = A \times \cos(\omega' \times t(i)) \times B \times \sin(\omega' \times t(i) + \Delta\Phi) \quad (11b)$$

[Mathematical Expression 14]

$$S2(j) = \frac{\sum_{i=1}^{M}(Z3 + Z4)}{M} \quad (12)$$

Reference symbol Z3 of Mathematical Expression 12 is represented by Expression (12a) provided below, and Z4 is represented by Expression (12b) provided below.

[Mathematical Expression 15]

$$Z3 = A \times \cos(\omega' \times t(i)) \times B \times \cos(\omega' \times t(i) + \Delta\Phi) \quad (12a)$$

[Mathematical Expression 16]

$$Z4 = A \times \sin(\omega' \times t(i)) \times B \times \sin(\omega' \times t(i) + \Delta\Phi) \quad (12b)$$

When the variable "i" is smaller than M (the first predetermined number) (No in step S40), processing proceeds to step S45, where one is added to the variable "i," and processing returns to step S200, where processing pertaining to the respective steps is iterated, whereby numerators of Equations (11) and (12) are integrated to M in connection with the averages S1(j) and S2(j). When the variable "i" has come to M (Yes is selected in step S40), the integrated value is divided by M, to thus determine the averages. The averages S1(j) and S2(j) may also be calculated from moving averages.

When the variable "i" has come to M or more, processing proceeds to step S50. Processing subsequent to step S50 is analogous to that shown in FIG. 3.

As mentioned above, during the air bubble diagnostic processing of the present embodiment, the fluctuation calculation section 220 calculates the fluctuations F1 and F2 based on the displacement signals SA, SB, the first detection signal DA4, and the second shift detection signal DB4, as in the first embodiment. The status value calculation section 60 calculates the status value DS showing a state of the air bubbles from the fluctuations F1 and F2, and the determination section 70 determines the state of the air bubbles from the status value DS. It thereby becomes possible to determine the state of the air bubbles in the target flow with accuracy regardless of the level of pressure of the target fluid.

The fluctuation calculation section 50, 120, 220, the status value calculation section 60, the determination section 70, the threshold value generation section 80, the first shift section 110, and the second shift section 210 may also be executed by a processor according to a predetermined program or implemented by a logic circuit.

According to the present invention, a Coriolis flowmeter calculates fluctuations based on a detection signal, calculates a status value showing a state of air bubbles from the fluctuations, and determines a state of air bubbles from the status value. Regardless of a level of pressure of a fluid subject to measurement, it thereby becomes possible to accurately determine a state of air bubbles in the fluid subject to measurement.

The present invention is not limited to the embodiments and encompasses a larger number of modifications and alterations without departing the entity of the invention. The present invention can encompass combinations other than the last combinations of the section.

What is claimed is:

1. A Coriolis flowmeter that vibrates a measurement tube through which a fluid subject to measurement flows, detects vibrations including Coriolis force developed in the fluid from the vibrations, and measures a mass flow rate of the fluid from a detection signal,
the Coriolis flowmeter comprising:
a fluctuation calculation section that calculates fluctuations based on the detection signal;
a status value calculation section that calculates a status value showing a state of air bubbles in the fluid from the fluctuations calculated by the fluctuation calculation section; and
a determination section that determines a state of air bubbles from the status value calculated by the status value calculation section.

2. The Coriolis flowmeter as set forth in claim 1,
wherein the fluctuation calculation section comprises:
a reference signal generation section that generates a reference signal through use of a frequency or angular velocity calculated based on the detection signal;
an average calculation section that calculates an average based on the reference signal generated by the reference signal generation section and on the detection signal; and
an average variation calculation section that calculates variations in the average calculated by the average calculation section as the fluctuations.

3. The Coriolis flowmeter as set in claim 2,
wherein the reference signal generation section generates a first reference signal and a second reference signal being 90° out of phase with the first reference signal; and
wherein the average calculation section calculates a first average that is an average of a product of the detection signal and the first reference signal and calculates a second average which is an average of a product of the detection signal and the second reference signal.

4. The Coriolis flowmeter as set forth in claim 2,
wherein the average variation calculation section calculates, as the fluctuations, variations in the average based on a current average, a last average, and a last but one average.

5. The Coriolis flowmeter as set forth in claim 1,
wherein the status value calculation section calculates a square mean value, a root mean square value, an average absolute value, or a square root of an average absolute value of the fluctuations.

6. The Coriolis flowmeter as set forth in claim 3,
wherein the average variation calculation section calculates, as first fluctuations, variations in the first average based on a current value of the first average, a last value of the first average and a last but one value of the first average and calculates, as second fluctuations, variations in the second average based on a current value of the second average, a last value of the second average, and a last but one value of the second average; and
the status value calculation section calculates an average of squares of the first fluctuations and squares of the second fluctuations, a square root of the average, and an average of absolute values of the first fluctuations and absolute values of the second fluctuations or a square root of the average.

7. The Coriolis flowmeter as set forth in claim 1,
wherein the determination section compares the status value with a threshold value to determine a state of the air bubbles.

8. The Coriolis flowmeter as set forth in claim 7, further comprising:
a threshold value generation section that generates, as the threshold value, a value based on the status value calculated when the air bubbles are not present.

9. The Coriolis flowmeter as set forth in claim 1,
wherein the fluctuation calculation section comprises:
a first shift section that generates a first shift detection signal which is 90° out of phase with a first detection signal detected by one vibration detection section;
an average calculation section that calculates an average based on a first shift detection signal generated by the first shift section, a second detection signal detected by the other vibration detection section, and the first detection signal; and
an average variation calculation section that calculates, as the fluctuations, variations in the average calculated by the average calculation section.

10. The Coriolis flowmeter as set forth in claim 1,
wherein the fluctuation calculation section comprises:
a first shift section that generates a first shift detection signal which is 90° out of phase with a first detection signal detected by one vibration detection section;

a second shift section that generates a second shift detection signal which is 90° out of phase with a second detection signal detected by the other vibration detection section;

an average calculation section that calculates an average based on a first shift detection signal generated by the first shift section, a second shift detection signal generated by the second shift section, the first detection signal, and the second detection signal; and an average variation calculation section that calculates, as the fluctuations, variations in the average calculated by the average calculation section.

* * * * *